(12) United States Patent
Kamerman

(10) Patent No.: US 7,414,717 B2
(45) Date of Patent: Aug. 19, 2008

(54) SYSTEM AND METHOD FOR DETECTION AND IDENTIFICATION OF OPTICAL SPECTRA

(75) Inventor: Gary W. Kamerman, Huntsville, AL (US)

(73) Assignee: Fastmetrix, Inc., Huntsville, AL (US)

( * ) Notice: Subject to any disclaimer, the term of this patent is extended or adjusted under 35 U.S.C. 154(b) by 384 days.

(21) Appl. No.: 10/690,334

(22) Filed: Oct. 21, 2003

(65) Prior Publication Data

US 2005/0083521 A1    Apr. 21, 2005

(51) Int. Cl.
  *G01J 3/44* (2006.01)
(52) U.S. Cl. ...................... 356/301; 356/326
(58) Field of Classification Search ................ 356/301, 356/310, 330, 326
  See application file for complete search history.

(56) References Cited

U.S. PATENT DOCUMENTS

| | | | | |
|---|---|---|---|---|
| 3,518,002 A * | 6/1970 | Barringer et al. | ............ | 356/310 |
| 3,578,846 A * | 5/1971 | Chen | ............ | 356/71 |
| 3,779,492 A * | 12/1973 | Grumet | ............ | 356/71 |
| 4,060,326 A | 11/1977 | Tirabassi et al. | ............ | 356/96 |
| 4,193,691 A * | 3/1980 | Fjarlie | ............ | 356/330 |
| 4,563,090 A * | 1/1986 | Witte | ............ | 356/328 |
| 4,609,289 A * | 9/1986 | Ritzl | ............ | 356/326 |
| 4,620,284 A * | 10/1986 | Schnell et al. | ............ | 702/28 |
| 4,787,750 A * | 11/1988 | Nelson et al. | ............ | 356/437 |
| 4,799,001 A * | 1/1989 | Burch | ............ | 318/640 |
| H780 H * | 5/1990 | Hartman | ............ | 356/71 |
| 4,958,376 A * | 9/1990 | Leib | ............ | 359/559 |
| 4,958,928 A * | 9/1990 | Kuderer | ............ | 356/328 |
| 5,748,308 A * | 5/1998 | Lindberg et al. | ............ | 356/310 |
| 5,815,261 A * | 9/1998 | Brooks et al. | ............ | 356/310 |
| 5,905,571 A | 5/1999 | Butler et al. | ............ | 356/328 |
| 5,987,188 A * | 11/1999 | Freyre | ............ | 382/278 |
| 6,163,378 A | 12/2000 | Khoury | ............ | 356/457 |
| 7,050,215 B1 * | 5/2006 | Johnson et al. | ............ | 359/586 |

* cited by examiner

*Primary Examiner*—Gregory J Toatley, Jr.
*Assistant Examiner*—Kara E Geisel
(74) *Attorney, Agent, or Firm*—Thomas, Kayden, Horstemeyer & Risley, L.L.P.

(57) ABSTRACT

A spectral correlator comprises a specimen and an optical device configured to collect light from the specimen and to optically determine a similarity of a received first spectra of the light collected from the first spectra and a second known spectra.

40 Claims, 14 Drawing Sheets

Mask

SYSTEM AND METHOD FOR DETECTION AND IDENTIFICATION OF OPTICAL SPECTRA

BACKGROUND OF THE INVENTION

1. Field of the Invention

The present disclosure generally relates to the field of identifying a molecular substance by a substance's spectra when spectra contains a plurality of colors, and more particularly to identifying an unknown molecular substance by comparing the substance's spectra with a spectra of a known substance.

2. Background

There are two primary categories for the detection of substances by spectral measurement and identification. The first is to detect a sample remotely. Such a system is frequently referred to as performing standoff detection. In this configuration a light source may be used to illuminate the target material from a distance and receive light scattered from the sample in a Lidar type system or it may receive light scattered from natural illumination or it may receive light produced by a self-illuminating material. Remote detection systems currently are Differential Absorption Lidar (DIAL), Differential Scattering (DISC), Infrared Fourier Transform Spectroscopy, (IR FTS), and Raman Lidar. IR FTS can also operate on self luminance or in a passive configuration using natural illumination.

The most common standoff chemical detection techniques are DIAL and DISC. Both systems employ the same basic phenomenology to remotely detect airborne or surface contaminants. In most configurations, such systems transmit a succession of highly monochromatic pulses at and near known absorption lines of materials of interest. These laser pulses reflect off airborne aerosols and/or hard surfaces and are detected by the DIAL or DISC receiver. If the material of interest is not present, the ratio of the reflected signal strength at the absorption wavelength to the reflected signal strength near the absorption wavelength is ideally one. A ratio value of less than one is a measure of the concentration of the material of interest.

Although DIAL and DISC techniques have been shown effective, they possess significant inherent deficiencies. Typically, current systems employ $CO_2$ lasers operating from 9.2 µm to 10.8 µm. $CO_2$ lasers have numerous R- and P-branch transitions with sufficient gain for efficient laser operation. However, switching from one laser transition at one wavelength to another requires retuning the laser. Rapid tuning of the laser cavity requires extremely precise control. Transmitter lasers based upon cavity tuning tend to be complex, require precision instruments to control the tuning, and are prohibitively expensive. Current efforts to transition technology from the former Soviet Union for the frequency conversion of $CO_2$ laser lines using high-pressure ammonia ($NH_3$) is promising, but the technology is not sufficiently mature for deployment. Non-$CO_2$ systems include optical parametric oscillators and optical parametric amplifiers configurations. These also tend to be very complex and, therefore, expensive. The complexity of these devices also reduces their reliability.

A serious limitation of these techniques are that the atmosphere or a potentially contaminated surface cannot be interrogated for multiple chemical species simultaneously with a single laser. A minimum of two pulses must be transmitted for each chemical of interest (one on the absorption line and one adjacent to it). The transmission of multiple pulses is required to evaluate multiple contaminants, even under the best of conditions. In practice, many lines are required to identify just one substance in the presence of interferants. An "interferant" refers to any substance other than the desired substance, which also emits a spectra. The wavelength of these laser pulses must match the absorption line within restrictive tolerances. This complicates system design and system cost, as laser wavelength cannot be selected arbitrarily in most lasers. In this regard, most laser wavelengths are dictated by quantized atomic or molecular energy states. The selected wavelength(s) must be precisely controlled to ensure that they match the absorption line. In addition, many useful detection lines (e.g., 3-5 µm, 8.3 µm) fall outside of the normal $CO_2$ laser gain lines, even for isotopic $CO_2$ lasers. Optical parametric oscillators and amplifier may also be used in such a scenario.

IR FTS measures the absorption spectra through a transmission/reflection path in the atmosphere or a test cell, or the spectra reflected or radiated from a solid surface. As a result, it often requires a calibrated source or reflector located on the opposite side of the volume to be interrogated. This is a viable approach in the laboratory or at fixed locations, but it is currently impractical for tactical and strategic applications.

Recent advances have implemented this technique with natural illumination as the source. This approach requires large training sets and extensive computation to remove background effects. Site contamination by the material of interest or by other chemical compounds require that training sets be collected at the test site prior to the introduction of real-time monitoring. Although promising, this approach is immature for tactical field deployment.

Raman Lidar transmits an intense pulse of monochromatic light, which stimulates the material in airborne gases, aerosols, liquids, and/or solids to radiate a spectrum of colors possessing wavelengths that are typically longer, but can be shorter, than the wavelength of the transmitted laser pulse. The offset of the wavelength of the radiated colors (i.e., the Raman spectrum) is a characteristic of the material of interest. However, while the offset is fixed, the wavelength of the transmitted laser light may be made variable. The transmitted light must be highly monochromatic, but the absolute wavelength of Raman Lidar is of less significance than in a DIAL system. As a result of the aforedescribed Raman process, the transmitter in a Raman Lidar may be considerably simpler than in a DIAL or DISC system.

Since all illuminated materials are exposed to the transmitted light simultaneously, all re-radiate their characteristic Raman spectra simultaneously. Thus, multiple species can be detected in parallel. The historical disadvantage of Raman Lidar is its lower sensitivity when it is compared to a DIAL system. This lower sensitivity is partially the result of the receiver architectures, which were designed for use in previous Raman Lidars. In addition, sensitivity is further reduced due to the relatively smaller Raman cross-section of the material as compared to the absorption cross sections observed in DIAL systems.

A Raman Lidar receiver commonly used is shown in FIG. 1A. Received light, via receiver element 8, is separated into its component wavelengths by a dispersive filter 6 (e.g., a grating or a prism). The separated light is imaged by imaging lens 4 onto a detector array 2.

The spectral resolution of the array 2 is determined by the characteristics of dispersive filter 6, the f-number of the imaging lens 4, and the size of the individual detectors. If the detector size is the limiting resolution parameter, the spectral range of the array 2 can be no greater than the resolution of a single detector multiplied by the number of elements in the array.

The very close spacing of some Raman lines often dictates high spectral resolution in many applications. The wide spectral separation of other lines simultaneously requires a large spectral range. Satisfying both requirements can necessitate a large number of detectors. Over 4000 detector elements (and in some cases 10,000) are not uncommon.

Charge coupled device (CCD) detector arrays are commonly used in Raman receivers since they permit a large number of detectors with a minimal number of electrical connections. Wiring 4000 individual detectors in parallel is impractical. Unfortunately, CCD detectors are not highly sensitive detectors. Furthermore, the overall sensitivity of the system is based upon its ability to detect the weakest (critical) line in the Raman spectra. An additional disadvantage is that the range resolution of this type of Raman Lidar is limited by the readout time of the detector array and typically not by the pulse length of the laser. Currently, a 4000 element CCD arrays can be readout in approximately 10 microseconds, which corresponds to a range resolution of about 1.5 kilometers. Thus, the speed at which data can be read via a CCD limits bandwidth, and therefore limits the range resolution.

Another Raman Lidar receiver commonly used is illustrated in FIG. 1B. Received light, via receiver element 8, is collected via collection optics 14 and imaged onto a spectral filter 12. The spectral filter will typically transmit only a single wavelength of light. The light which emerges from the spectral filter 12 is then imaged by lens 11 onto the single detector 10. In this regard, the spectral filter 12 is configured to enable only one wavelength of light to be passed through to the detector 10, and such a system typically operates effectively when a low concentration of an interferant exists in the light received by the receiver element 8.

The spectral filter 12 is typically designed to image the received light onto the single detector 10. In this regard, the spectral filter 12 is configured to only enable one predominant molecule corresponding to one wavelength of light to be passed through the detector 10, and such a system typically operates effectively when a low concentration of an interferant exists in the light received by the receiver element 8. Typically, these filters are made to observe atmospheric characteristics such as $O_2$, $O_3$, or $N_2$. However, since only one, or a very small number of detectors are used, detectors having greater sensitivity and bandwidth than CCD detectors can be used. In this configuration signal as a function of distance can be recovered to improve range resolution.

The spectral filter 12 may be implemented using a variety of optical principles. For example, it may comprise a grating, which refers to an optical device consisting of a surface with many parallel grooves in it that disperses a beam of light into its component wavelength. Generally, the angle of the gratings determine the wavelength of light that is output from the grating, and the grating's resolution is determined by the number of lines in the grating. It may also comprise an interference filter, etalon, other devices or a combination of these techniques. Thus, with reference to FIG. 1B, the spectral filter 12 may be manipulated mechanically, electrically, and/or thermally, such that the filter is "tuned" to transmit a particular wavelength.

Although the system of FIG. 1B can have high sensitivity and bandwidth, there are various disadvantages. Most notably, much of the content of the received spectra is lost, because of all the wavelengths received in the spectra only one of them is transmitted and is available for detection by detector 10. Likewise, in order to subsequently obtain any information related to the wavelengths not previously detected, the spectral filter 12 must be tuned a plurality of times to detect the corresponding plurality of wavelengths. Further, for each wavelength that one desires to discern, a corresponding pulse must be initiated, resulting in a lengthy process.

As described herein, manipulation of the spectral filter 12 is usually performed by tuning to a particular wavelength, imaging the received light onto a detector 10, then retuning the spectral filter 12 to a different desired wavelength, thereby requiring that the process be repeated for each desired wavelength. Various monochromators provide this functionality by enabling a user to turn a knob on the monochromator to select various wavelengths, which adjust a grating within the monochromator.

Another disadvantage of DIAL and DISC systems which transmit multiple wavelengths, Raman systems which transmit multiple pulses and retune the receiver to observe multiple Raman spectral lines, and FTS systems which must collect signals for a significant period of time in order to obtain sufficient sensitivity is that the sample must not change during the measurement period. Changes in material composition during the measurement period can result in erroneous readings.

The second category for spectral measurement and identification is commonly referred to as point detection. The characteristic for this category is the specimen is in direct proximity to the instrument. For example, during atmospheric measurements when an operator is located in the same area as the sample and is exposed to the sample this is a point detection configuration. In contrast to point detection, stand off detection occurs when the operator is so remote from the sample that they are unaffected by its composition. Overall the same methods and techniques used for remote detection may also be used for point detection. In general, point detection systems may be more sensitive as they operate at shorter distances.

SUMMARY

Generally, the present disclosure provides a system that correlates the spectra of an unknown specimen with the spectra of a known substance to determine similarity of the two substances.

A first embodiment of the present disclosure comprises a specimen and an optical device configured to collect light from the specimen and to optically determine a similarity of a received first spectra of the light collected from the first spectra and a second known spectra.

Another embodiment of the present disclosure is a spectral correlation method comprises the steps of receiving a first spectra corresponding to a specimen and performing a first Fourier transform on the first spectra via a first lens to obtain a transformed first spectra. The method further comprises multiplying the transformed first spectra with a representation of a known spectra to obtain a similarity signal and focusing, via a second lens, the similarity signal on a detector.

DETAILED DESCRIPTION

Generally, systems and methods of the present disclosure pertain to spectral correlators that use optical correlation to discriminate molecular specimens by their spectra. In particular, a system in accordance with the present disclosure compares a received spectra of a specimen with a known reference spectra of a molecular substance of interest by correlating a representation of the received spectra in the frequency domain with a representation of the known reference spectra in the frequency domain. With respect to the present disclosure, correlation is a term that refers to the process of determining similarity between the representation of the received spectra and the representation of the reference spectra.

Figure 1A:
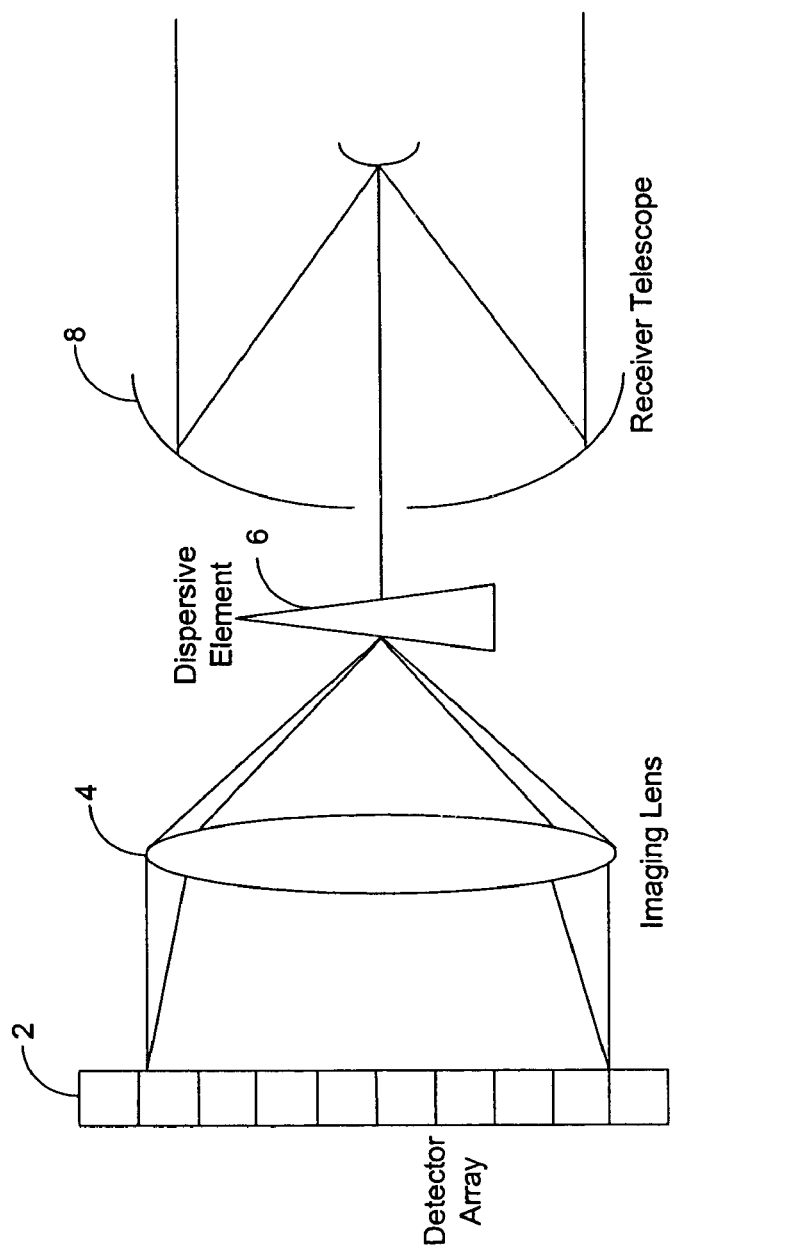
FIG. 1A illustrates a conventional prior art Raman lidar receiver.
Figure 1B:
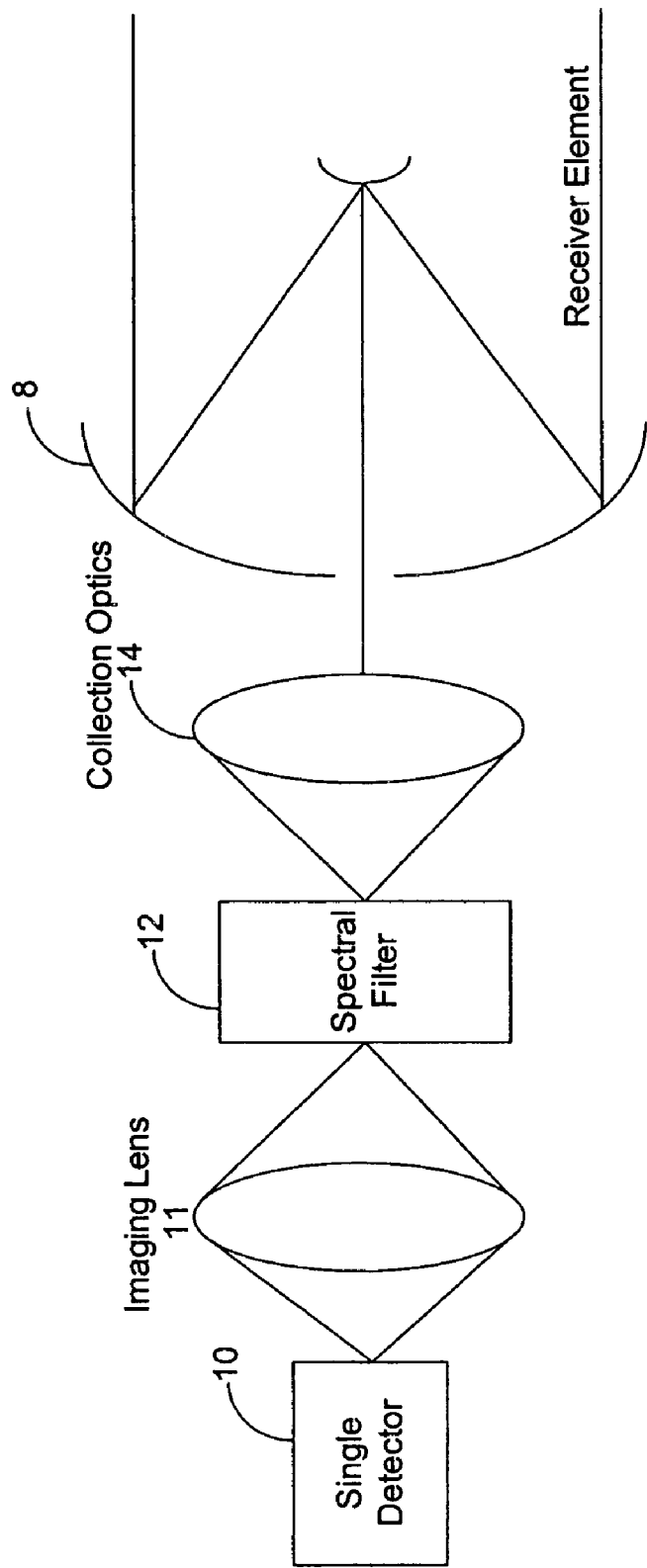
FIG. 1B illustrates a conventional prior art Raman lidar receiver having a tunable spectral filter.
Figure 2:
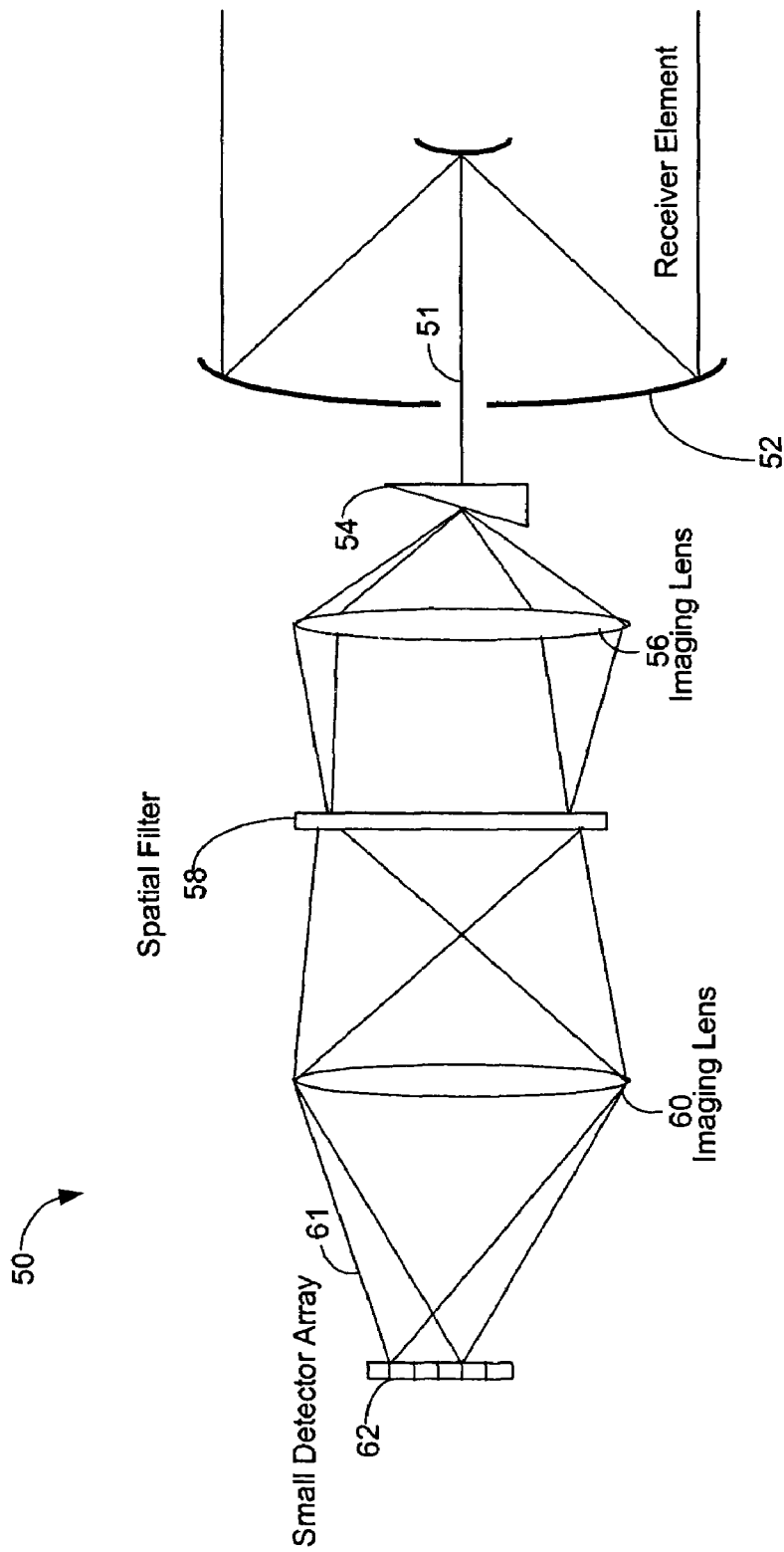
FIG. 2 illustrates an optical component diagram of an optical system of an exemplary embodiment of the present disclosure.

FIG. 2 depicts an exemplary system 50 of the present disclosure that receives spectra 51 and transmits a signal or set of signals that indicate whether the spectra 51 is similar to the spectra of a known substance, i.e., positively correlates with a spectra of a known substance. Generally, the system 50 comprises a receiver element 52, a wavelength spreading element 54, a pair of imaging lenses 56 and 60, a spatial filter 58 situated between the lens 56 and lens 60, and a detector or detector array 62. The wavelength spreading element 54 is a dispersive element, for example, a refractive element such as a prism, or diffractive element such as a grating.

A spatial filter in accordance with the present disclosure preferably comprises a mask having a transparent region in an otherwise opaque region, which is designed to eliminate undesired information. The design of the spatial filter 58 is described in more detail hereafter. Notably, however, the spatial filter may be designed to embody a Fourier transform of the known reference spectra representing a substance of interest, and such a filter is an ideal "matched filter" in the presence of white nose. A matched filter refers to a spatial filter designed to separate a relevant signal from the undesired information, also known as noise and clutter (non-specific spectral lines), and such a filter maximizes a signal-to-noise (S/N) ratio so that a spectra of known shape can be separated from random noise. The Fourier transform may be modified to block common interferants in the filter plane. However, in this case the filter is technically not a "matched filter" since the original transform has been modified. Also, when other than white noise is present, the Fourier transform is not a matched filter.

During operation, the dispersive element 54 receives the spectra 51 of the unknown specimen via the receiver element 52, and separates the received spectra into its component wavelengths. Note that by separating the received spectra into its component wavelengths, the transmitted spectra is in the angular domain, i.e., the spectra is separated angularly when it is received by the imaging lens 56.

The lens 56 inherently performs a Fourier transform on spectra received if spectra is a focal distance away from the lens 56. In order to retain all the information in the spectra, the lens is preferably of a diameter sufficient to prevent vignetting, i.e., the lens preferably does not chop off frequencies contained in the spectra. In this regard, the imaging lens 56 performs a Fourier transform on the received spectra that has been separated into its wavelength components, which then places the received spectra in the spatial domain.

The spatial filter 58, as described herein, preferably embodies a representation of the Fourier transform of the known spectra of the substance of interest or a representation of a modified Fourier transform of the known spectra. Further, the imaging lens 60, inherently performs an inverse Fourier transform on the signal received from the spatial filter 58. Thus, when the spectra, which is now in the spatial domain, transmits through the spatial filter 58, such transmission optically compares the Fourier transform of the spectra of the specimen with the Fourier transform of the known spectra embodied in the spatial filter 58. Mathematically, the described optical comparison is represented by the product of the Fourier transform of the received spectra in the frequency domain and the Fourier transform of the known reference spectra. Further, the imaging lens 60 performs an inverse Fourier transform on the product received from the spatial filter 58, and the detector 62 detects a signal(s) 61 that is indicative of the similarity of the received spectra and the spectra of the known specimen. Thus, the system 50 performs optical correlation.

Figure 3:
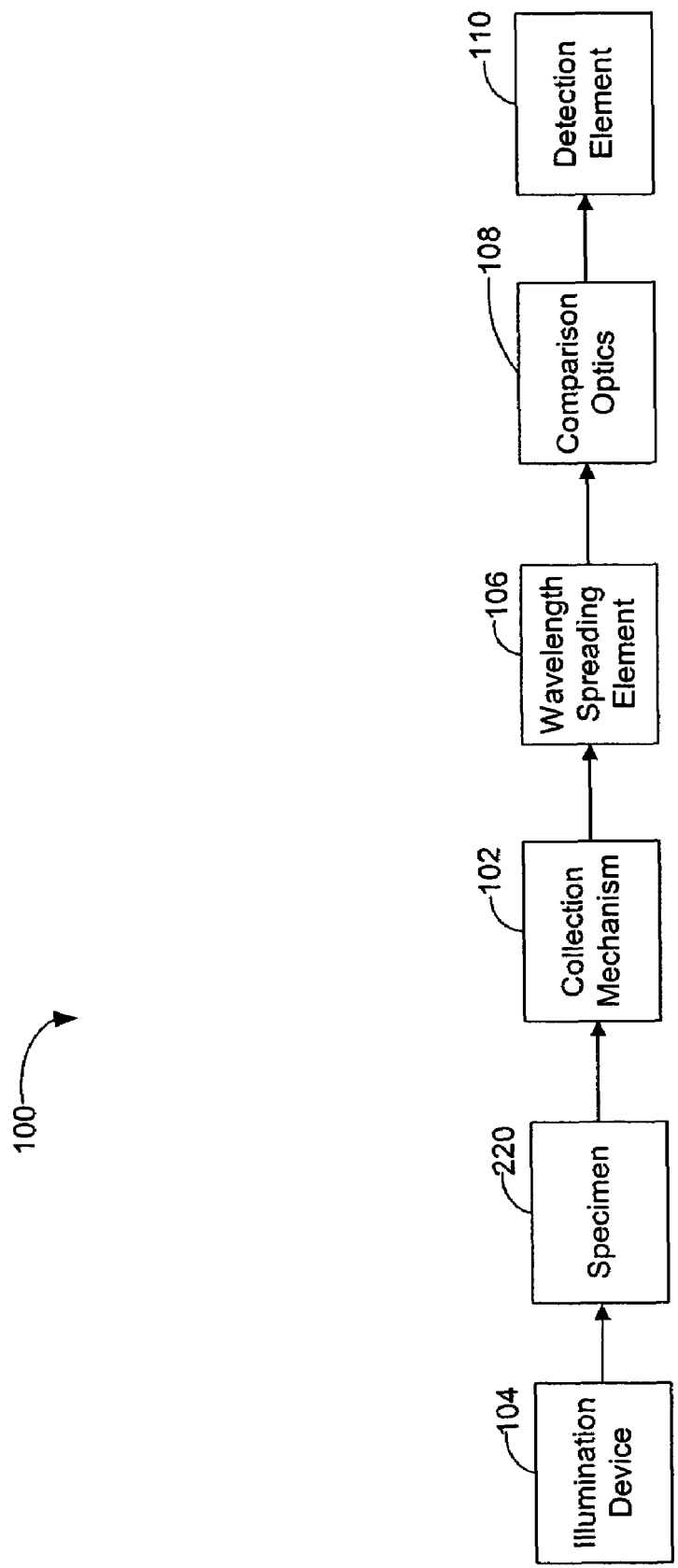
FIG. 3 is a block diagram illustrating the functional components of a correlation system of the present disclosure.

Generally, an exemplary correlator system 100 in accordance with the present disclosure is depicted in FIG. 3. The system 100 comprises illumination device 104, collection mechanism 102, specimen 220, wavelength spreading element 106, comparison optics 108, and a detection element 110.

In the system 100, illumination device 104 illuminates specimen 220 housed in the specimen container 204. The collection mechanism 102 collects the spectra emitted from the illuminated specimen, another embodiment of which is described in more detail with reference to FIG. 5.

The collection mechanism 102 directs the emitted spectra to the wavelength spreading element 106, which separates the spectra received into its wavelength components. The wavelength spreading element 106, which in the illustrated embodiment of the system 100, comprises a dispersive filter 208, hereinafter described in FIG. 4. However, as described herein the wavelength spreading element may comprise other optical elements that perform a wavelength spreading function. The wavelength spreading element 106 then directs the received spectra, which is now broken down into its wavelength components, to the comparison optics 108.

The comparison optics 108 perform an optical comparison, as described hereinabove with reference to FIG. 2, of the received spectra broken down into its wavelength components with a spectra of a known molecular substance and transmits a detection signal to the detection component 110. The detection component 110 receives the detection signal and emits a similarity signal indicative of the similarity of the received spectra with the spectra of the unknown substance.

Further, the intensity of the similarity signal encompasses quantitative data, as well, in that the intensity of the similarity signal can be analyzed in order to determine the quantity of the substance of interest in the specimen.

Figure 4:
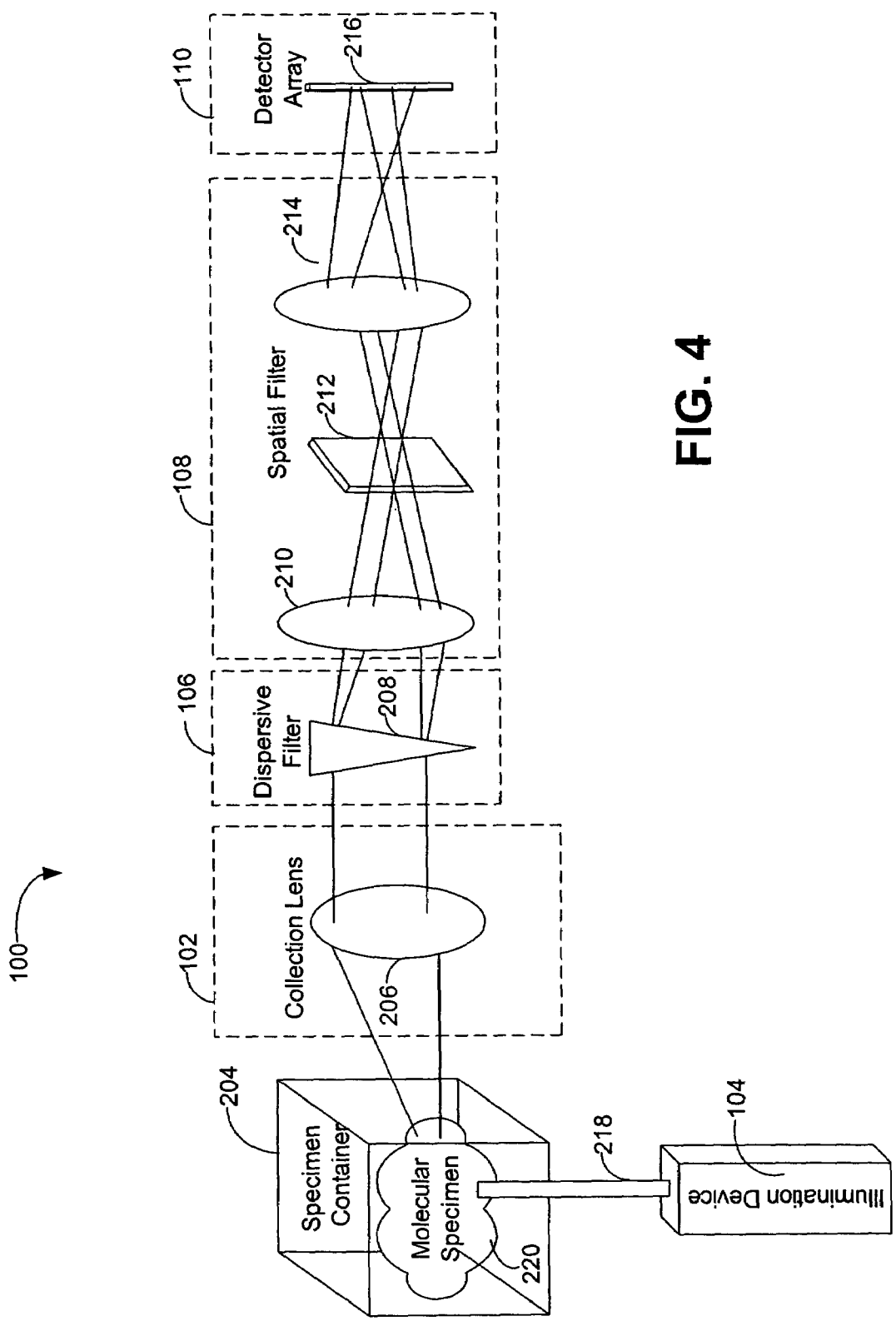
FIG. 4 illustrates a more detailed correlation system of FIG. 2 depicting a configuration of optical components.

FIG. 4 illustrates a detailed view of an exemplary embodiment of the correlator system 100 of FIG. 3. In this regard, the collection optics 102 of the correlator 100 comprise a sample container 204 that houses a molecular specimen 220 and a collection lens 206. The specimen 220 can comprise an individual chemical compound, mixtures of compounds, or mixtures of compounds in the presence of interferants. An interferant is a term that refers to any other component contained within the specimen that may affect the identification of the core substance making up the specimen 220.

The collection lens 206 of the collection optics 102 of the correlator system 100 preferably collects and directs light waves emitted from the specimen 220 due to illumination by illuminating device 104 to wavelength spreading optics 106, which comprise a dispersive element 208. The dispersion element 208 may comprise, for example, a prism or an optical grating that is designed to separate the wavelength components of the spectra.

Further, the filter optics 108 of the exemplary correlator system 100 comprises lenses 210 and 214 having a spatial filter 212 inserted between them. Each lens 210 and 214 may be of various types of lenses, such as, for example, the lenses 210 and 214 may be a spherical lens or a cylindrical lens or a combination of spherical and cylindrical lenses depending upon the application of the system 100. Notably, any optical configuration known or hereinafter developed may be employed in an embodiment of the present disclosure provided that the spectra is transformed into a spatial plane.

With respect to the described system 100, as the received spectra is transmitted through the optical system 100 and transformed at each step, i.e., transmission through the collection optics 102, the wavelength spreading optics 106, the comparison optics 108 and the detection element 110. The similarity signal exhibits a gain when compared to the intensity of any individual wavelength of the received spectra. In this regard, the gain experienced by the spectra is a result of optical summation of the various spectra lines into a single detection signal.

The detection component 110 of the correlator system 100 preferably comprises a detector array 216. Note, however, that the detector array 216 may comprise only a single detector, e.g., photodiode. In addition, the single detector may be a single element in the detector array.

Moreover, the correlator system 100 preferably comprises an illumination device 102, which may comprise any laser. In this regard, the illumination device 102 may comprise a monochromatic light source or a broadband light source. With respect to Raman signatures the illumination is preferably highly monochromatic to prevent broadening of the Raman spectra. Thus, the molecular specimen 220 is illuminated by light 218, which is emitted from the illumination device 102. Such illumination occurs within the sample container 204, whereby the light 218 excites the molecules of the molecular specimen 220. Upon excitation scattering occurs, and spectra, i.e., light waves resulting from the scattering, are directed from the sample container 204 to the collection lens 206.

The collection lens 206 collects the spectra emitted from the illuminated specimen in the container 204. The collection lens 206 is preferably a positive lens, e.g., a convex lens that serves to collect the light and direct it into the subsequent system optics, i.e., dispersion optics 106 and correlation optics 108.

Figure 5:
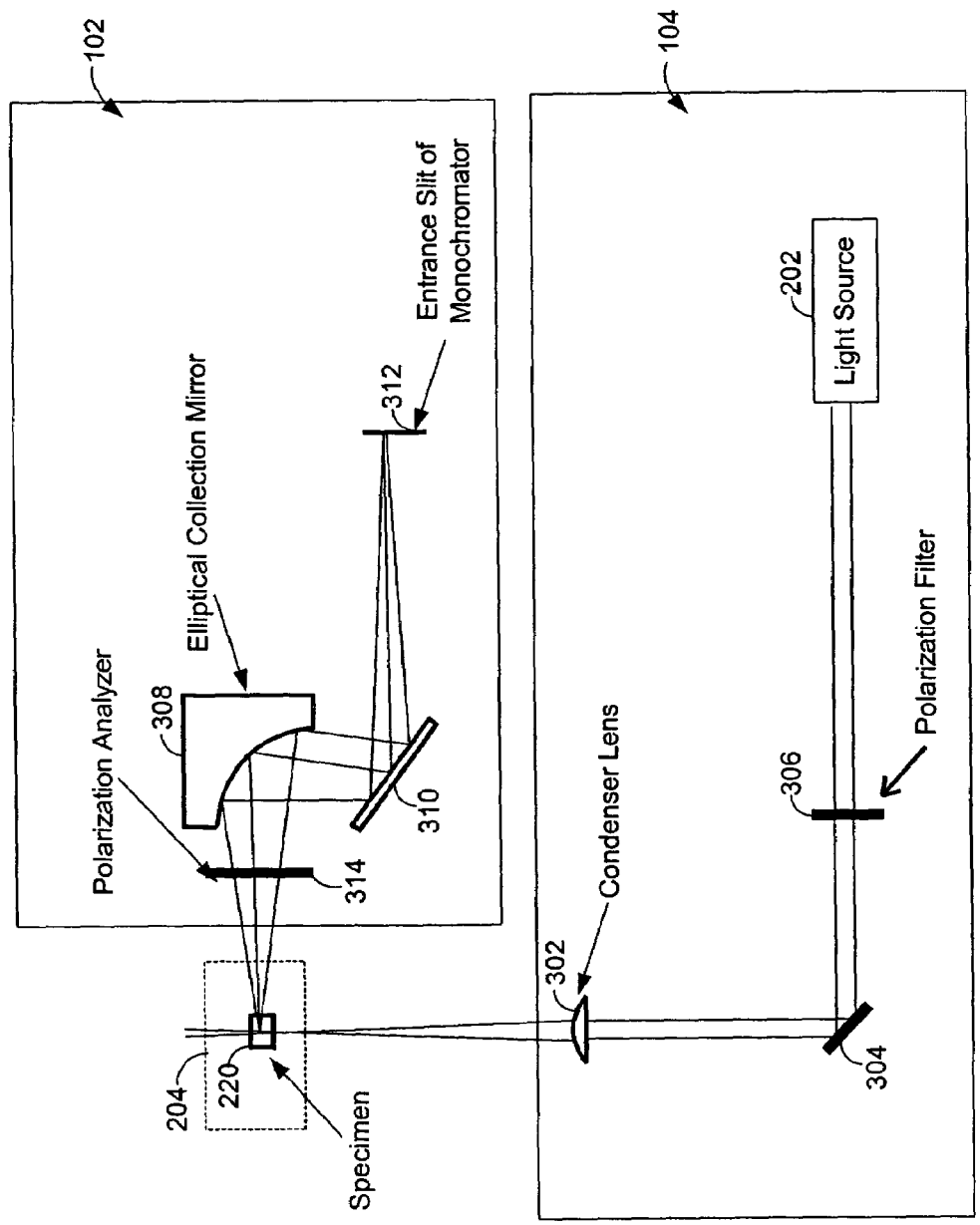
FIG. 5 illustrates exemplary collection optics of the correlation system of FIG. 4.

In some embodiments, the spectra being detected encompasses the Raman spectra of the specimen. In such embodiments, the spectra emitted, and/or reflected, from the illuminated specimen 220 is collected by an optical system preferably at right angles to the laser illumination path, as shown in FIG. 5. Placement of the optical system at right angles maximizes the signal to noise ratio (SNR) by minimizing the Rayleigh scattering, i.e., the elastic scattering, that occurs upon illumination. Placement of the optical system at right angles is however not required and in some applications is impractical. In this regard, the Raman scattering is omni-directional, so the intensity of the Raman scattering is unaffected by the choice of geometry. This system may detect both stokes and anti-stokes Raman scattering.

The dispersive element 208 receives the spectra from the collection lens 206 and preferably separates the spectra received into its various wavelength components, as described hereinabove, which it then transmits to subsequent system optics, i.e., filter optics 108. As noted herein, the dispersive element 208 can comprise a prism, for example, that is generally a triangular piece of glass or plastic that receives light and separates the light received into its component wavelengths. Further, it may comprise an optical grating.

In an exemplary embodiment, the dispersed spectra emitted from the dispersive element 208 is then imaged onto the spatial filter 212 via a Fourier transform lens 210. In this regard, the lens 210 performs a Fourier transform on the spectra received from the dispersive element 208, as described hereinabove. In an exemplary embodiment of the correlator system 100, the spatial filter 212 preferably comprises the Fourier transform, or modified Fourier transform, of the spectra of a substance of interest, which is a characteristic of the molecular makeup of the system. When the spectra is focused onto the filter 212 via lens 210, the spectra is transmitted through the spatial filter 212, which perform an analog multiplication of the Fourier transform of the received spectra with the Fourier transform, or modified Fourier transform of the known spectra.

The light is then focused onto a detector by the second imaging lens 214. The second lens 214 performs an inverse Fourier transform on the product received from the spatial filter 212. In this regard, transmission of the light through the dispersive element 208, the lens 210, the spatial filter 212, and the imaging lens 214 is effectively performing correlation of the spectra. Optically, the result appears as a bright spot in the image plane, and the amplitude of the result is indicated by the brightness of the spot produced in the focal plane. Thus, a detector is used to detect the intensity of the spot and signal produced by the detector indicates whether the spectra of the specimen corresponds to the spectra of the substance of interest. Therefore, the spectra is processed before the detector rather than using the signal received from the detector to program a digital or an optical processor.

As described above, the system 100 produces a noticeable gain relative to other techniques as the spectra is transmitted through the system. In this regard, the optical signal representative of the spectra of the specimen passes through the comparison optics 108 and integration and multiplication are performed on the optical signal. Such integration performed by the spatial filter 212 and the lens 214 in performing the correlation function produce such a gain. To achieve the gain the series of lenses collimate and focus light. At the correlation plane, where a bright spot is observed all of the signal is focused to one spot. This concentrates the received intensity over a smaller area, increasing the number of photons per area measured by the detector. Thus, the system 100 enables detection of weaker input spectra.

Such an exemplary correlator system 100 using a first lens 210 that performs a Fourier transform on the received spectra and a second lens 214 that performs an inverse Fourier transform on the filtered spectra, takes advantage of two properties of Fourier analysis. First, a Fourier transform is its own inverse. Second, the correlation of two functions is equal to the inverse Fourier transform of the product of the Fourier transforms of the two functions. Such principles can be illustrated by the following formula:

$$g*h = F^{-1}\{F(g) \cdot F(h)\} = F\{F(g) \cdot F(h)\}$$

where F is the Fourier transform, $F^{-1}$ is the inverse Fourier transform, and g and h are arbitrary functions. Optically, a simple imaging lens is a Fourier transform device. In this regard, this property of a simple imaging lens enables the lens to focus all of the light, which it receives from a given direction, onto a single point. Such property is limited by the resolution of the lens, which is, in turn, limited by the Fourier transform of its diameter.

The spatial filter 212 is specific to the substance of interest. In this regard, the spectra corresponding to a specific molecular makeup of a known substance is used in creating the spatial filter for that particular substance. Thus, the spatial filter 212 created for the specific substance can then later be used in discriminating the presence of the molecular substance in the unknown specimen 220. An example is provided and described in more detail with reference to FIG. 7-FIG. 9.

Further, when all discrete wavelength lines of the spectra of the specimen 220 are focused onto a single detector as described herein, the amplitude of the signal detected is noticeably larger than it is if the light is not focused onto a single detector. Thus, the detection limit is not determined by the weakest critical spectral line of light from the spectra but from all the discrete wavelength lines in the spectra focused onto a single detector. Thus, the detection sensitivity of the correlator of the present disclosure is extremely high.

In addition, the spatial filter 212 may comprise multiple spatial filters representative of multiple substances, wherein each filter corresponds to the spectra of a different substance of interest. In this regard, the detector 216 may comprise multiple detectors, one detector for each chemical of interest.

Various types of detectors may be used in embodiments of the correlator system 100. For example, photo multiplier (PMT), CCD, or avalanche photodiode (APD) may be used in the correlator system 100.

Further note that the light that is filtered by spatial filter 212 is imaged onto the detector array 216 via the Fourier transform lens 214. Thus, if a molecular substance corresponding to the spatial filter inserted into the system is present in the specimen illuminated, then its presence is indicated in the signal detected by detector array 216. Specifically, the optics can be configured to generate a signal with a detectable intensity above a specific threshold if such molecular substance is present in the specimen 220.

FIG. 5 illustrates exemplary illumination device 104, housing 204 and collection mechanism 102 of FIG. 3. Note that in other embodiments of the disclosure, other variations, configurations, and combinations of optical components can be used in order to collect the spectra of a specimen 220 contained within housing 204.

Generally, exemplary collection mechanism 102 preferably comprises a polarization analyzer 314, and elliptical collection mirror 308, a mirror 310, and an entrance slit to a monochromator, described in more detail with reference to FIG. 6. Further illustrated in FIG. 5 is the housing 204, which contains the specimen 220 and illumination device 104. The illumination device 104 further comprises a light source 202, a polarization filter 306, a reflector 304, and a condenser lens 302.

The light emitted from light source 202 is directed through polarization filter 306. The reflector 304 directs the light received through optical device 306 through condenser lens 302. The condenser lens 302 preferably comprises a single positive lens or group of lenses that collect the light from the illumination device 202 and cause the light to evenly illuminate the specimen 220 contained within the specimen container 204.

The light emitted and/or reflected from the illuminated specimen 220 is directed through a polarization analyzer 314 and collected via the elliptical collection mirror 308. The mirror 308 reflects the light toward optical component 310, which causes the light to be directed through an entrance slit 312 of a monochromator 300, which is illustrated and described in more detail with reference to FIG. 6. Note that a monochromator is an instrument in which some form of detector is used to measure the radiation in a particular wavelength region where the region is defined by the wavelength spreading element 208.

An illustration of exemplary dispersion optics 106 and correlation optics 108 is now described with reference to FIG. 6. FIG. 6 depicts a modified monochromator, which enables the optical correlation of the generated spectra with the spectra of a known substance.

As shown, the dispersive optics 106 comprise optical elements 403-409, which perform the function of the dispersive element 208 (FIG. 4), i.e., separates the spectra into its component wavelengths. Note that such configuration of mirrors and lenses is not pivotal to the invention, although, such configuration is configured to separate the optical signal received via the entrance slit 312 into its wavelength components. The correlation optics 108 comprise the lens 410, the spatial filter 212, a filter adapter 412, a lens 414, cooled housing 415, and a cathode 419. The cooled housing 415 comprises a window apparatus 416, PMT 417, and a tube socket 418.

Lens 402 collimates the light, which passes through the entrance slit 312, i.e., lens 402 ensures that each ray in the light entering the entrance slit 312 is transmitted in parallel with the other rays of light in the optical signal.

Lens 410 serves to perform the Fourier transform on the light dispersed via the components 403-409. Further, spatial filter 212 is inserted in the filter adapter 412, and the filter adapter 412 is configured to receive the transmitted light from lens 410. Thus, transmission through the spatial filter 212 performs the multiplication as described herein with reference to FIG. 4 on the Fourier transform of the light received from lens 410 and the Fourier transform of a known spectra embodied in the spatial filter 212 inserted into the adapter 412.

The lens 414 is configured to perform an inverse Fourier transform on the light transmitted through the spatial filter 212. The correlation optics 108 transmits a signal 422 indicative of detection of the similarity of the spectra of the specimen with the reference spectra corresponding to the filter 212.

The photomultiplier tube (PMT) 417 and tube socket 418 preferably comprise a photon counting capability that is used to evaluate luminance by determining the number of photons emitted within a sample passed through it. The PMT is a term that refers to a tube consisting of an evacuated envelope with a photocathode 419 that emits electrons when exposed to light. These electrons are accelerated by a positive electrostatic field and fall upon a metal surface, or dynode, where they emit secondary electrons that are again accelerated to generate more electrons at the next metal surface, and so on.

The whole arrangement thus acts as a combination of a simple photocell with a high-gain amplifier in a self-contained unit.

An exemplary spatial filter 212 and its production and configuration in accordance with the system 100 is now described with reference to FIG. 6-FIG. 9.

Figure 6:
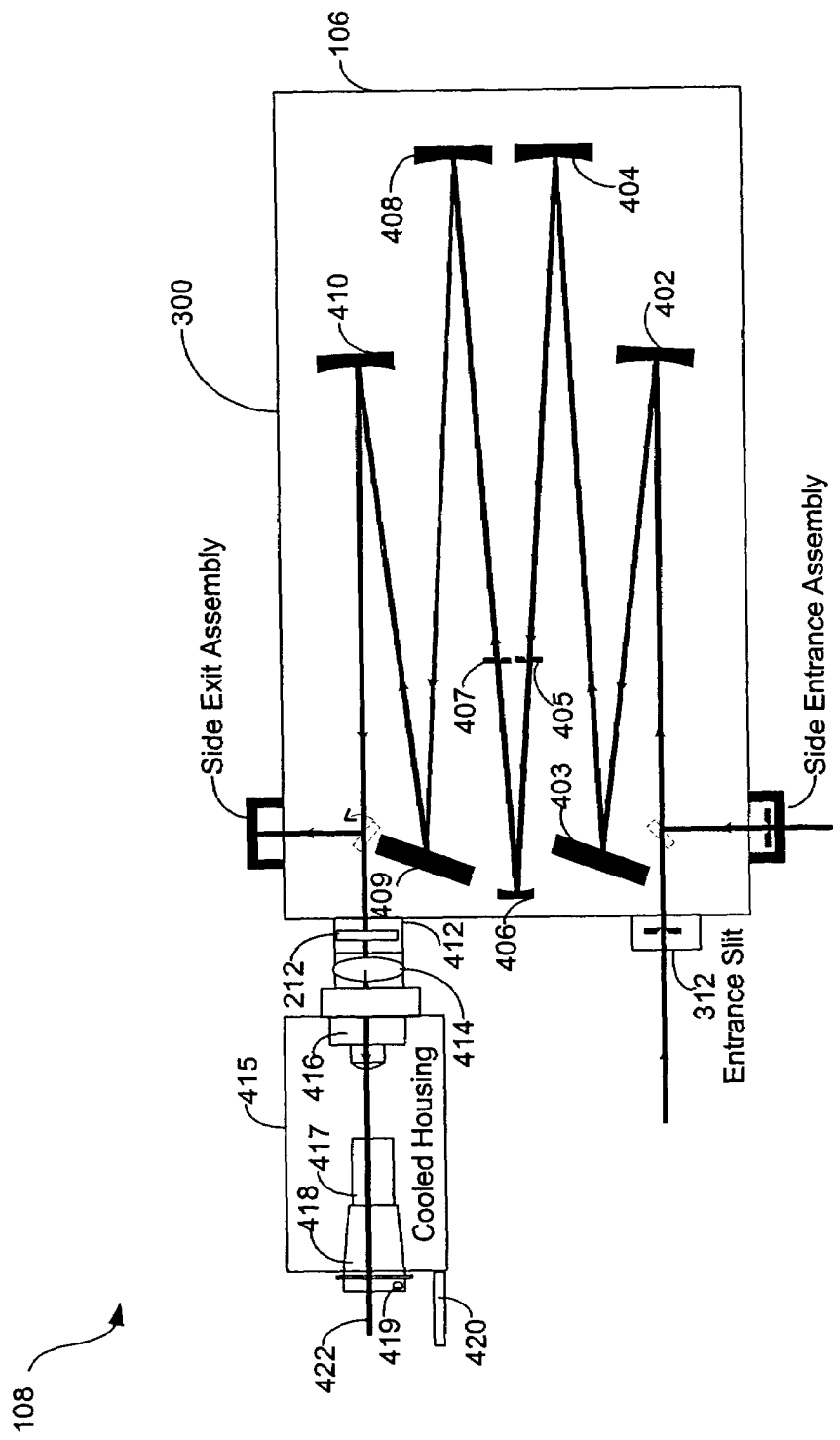
FIG. 6 illustrates exemplary correlation optics of the correlation system of FIG. 4.
Figure 7:
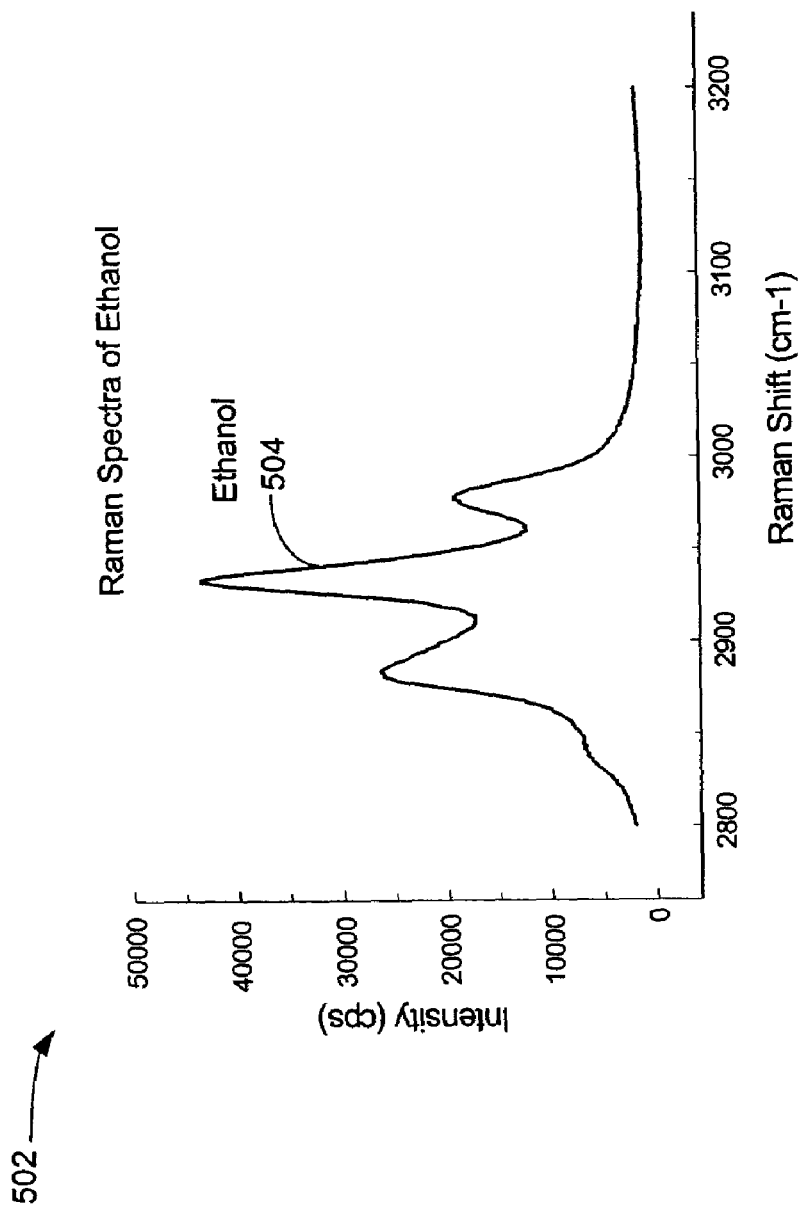
FIG. 7 is a graph illustrating Raman spectra of ethanol.

FIG. 7 illustrates a graph 502 of Raman spectra of Ethanol 504. Notably, most molecular substances exhibit an identifying Raman spectra that serves as a "fingerprint" for the molecular substance. The spectra 504 illustrated in graph 502 may be measured with a monochromator with a cooled PMT detector and photon-counting electronics, as shown and described in FIG. 6.

In order to detect a concentration of ethanol either remotely or via point detection, the spatial filter 212 (FIG. 4) is created in accordance with the ethanol Raman spectra illustrated in FIG. 7. Thus, a filter 212 in accordance with the present disclosure preferably comprises a mask embodying the Fourier transform, or modified Fourier Transform, of the Ethanol Raman spectra, which may be optically compared, via optical multiplication, to the received spectra with the mask.

An exemplary procedure for capturing the representation of the Fourier transform on the mask may comprise employing the system in FIG. 6. The spatial filter 212 may be replaced, for example, with photographic film. A known substance may be used as the specimen 220 (FIG. 5). For simplicity of illustration, the remaining mask preparation shall be described with reference to Ethanol. Therefore, the specimen Ethanol may be inserted into the container 204 and illuminated with the illumination element 102. The spectra emitted, or reflected, from the specimen is then collected via collection optics 314, 308 and 310, and is directed into the slit 312 of the monchromator.

The photographic film inserted in the place of the spatial filter 212 is then expose to the spectra of the Ethanol, which as described herein, after transmission through the monochromator embodies the Fourier transform of the Ethanol spectra. Such embodiment comprises the line pattern on the film of the single specimen species, e.g., the Ethanol.

Figure 8:
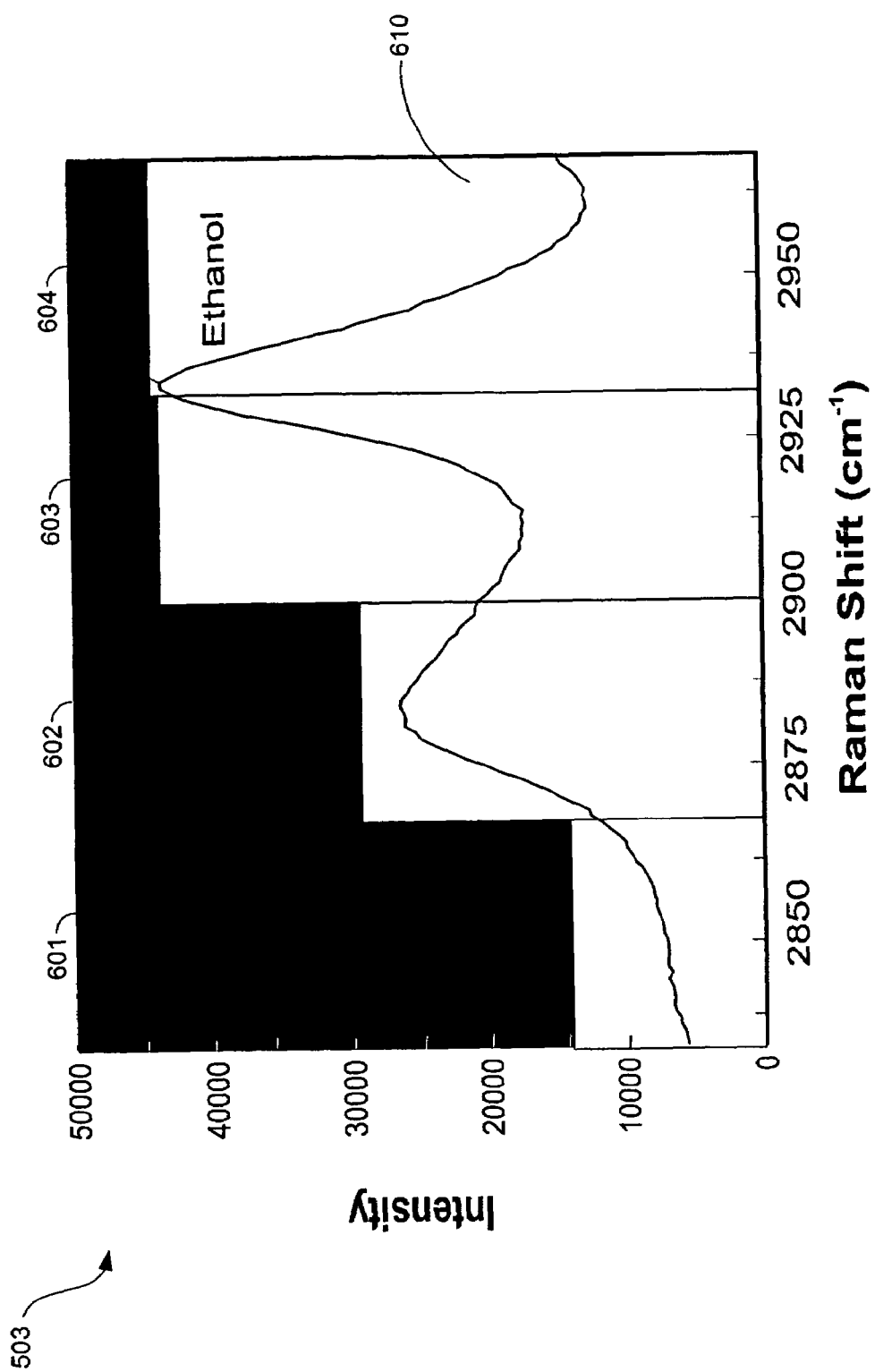
FIG. 8 is the graph of FIG. 7 illustrating the wavelength spectra of Ethanol.
Figure 9:
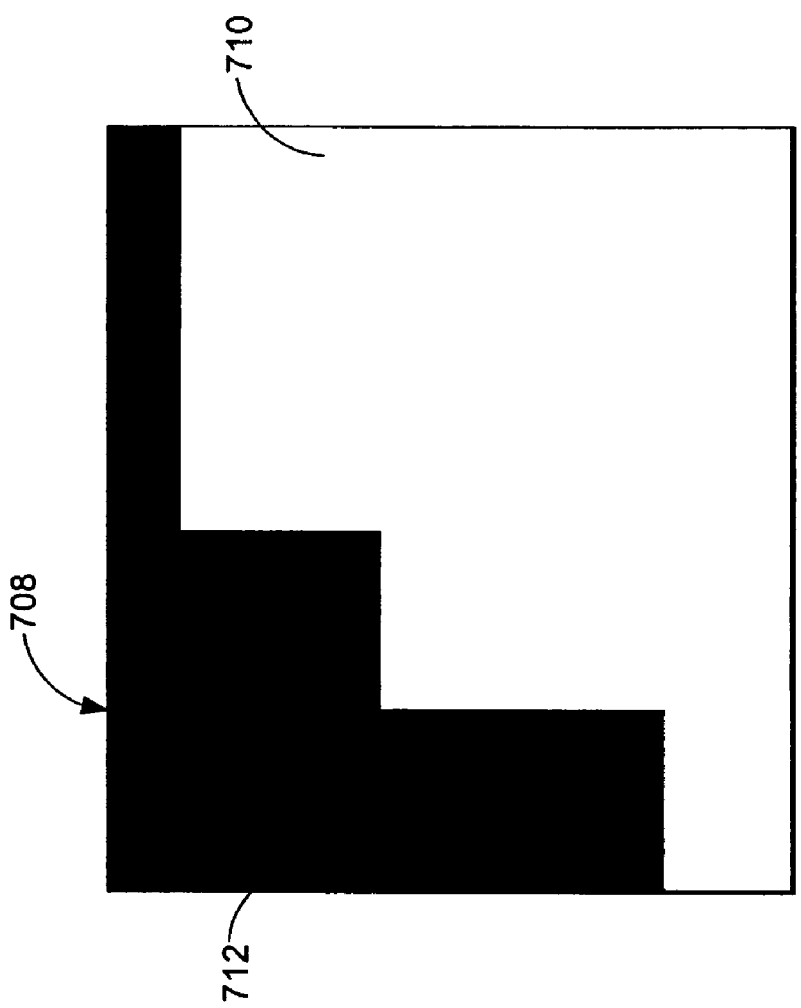
FIG. 9 depicts a representative spatial filter for the system of FIG. 3 exhibiting a mask calculated for the detection of Ethanol.

With reference to FIG. 8, the graph 503 illustrates the signature of the Raman spectra of the Ethanol. As indicated in the graph 503, the intensity of the Ethanol spectra between 2875 cm-1 and 2975 cm-1 is measurable. Thus, the exposed photographic film may be used to create a mask as illustrated in FIG. 9. The representation in FIG. 9 is a binary form of the mask created by an etching process. Recordation of the area 710, which indicates exposure intensity of the Ethanol Raman spectra at the indicated wavelengths, and lack of exposure intensity in the area 712 may be used to create a mask.

Such recordation on the photographic film may be used in an etching process to create a mask. Thus, the area 710 would be made transparent, so that spectra at Ethanol-indicative wavelengths would pass to the detection stage of the system, and the area 712 of the mask would be made opaque, so that spectra not at Ethanol-indicative wavelengths would not pass to the detection stage of the system.

Further, in other embodiments other procedures may be employed to create a mask sufficient for performing a multiplication of a Fourier transform of a spectra of an unknown specimen with a Fourier transform of a known spectra. For example, digital capture lithograph, or spatial light modulator may be used to create such a mask.

To eliminate the effects of common interferants and/or clutter, a modified Fourier transform may be employed for the filter mask. In the modified Fourier transform mask, a portion of the known spectra is physically blocked for example, when film is used as the mask, a piece of tape may be placed over a portion of the transmission area eliminating those frequencies. This spectral transmission region may be common to several other molecules and therefore non-specific to the substance of interest. When the mask is altered to remove non-specific spectral characteristics the filter mask is no longer the exact representation of the Fourier transform of the specimen.

Figure 10:
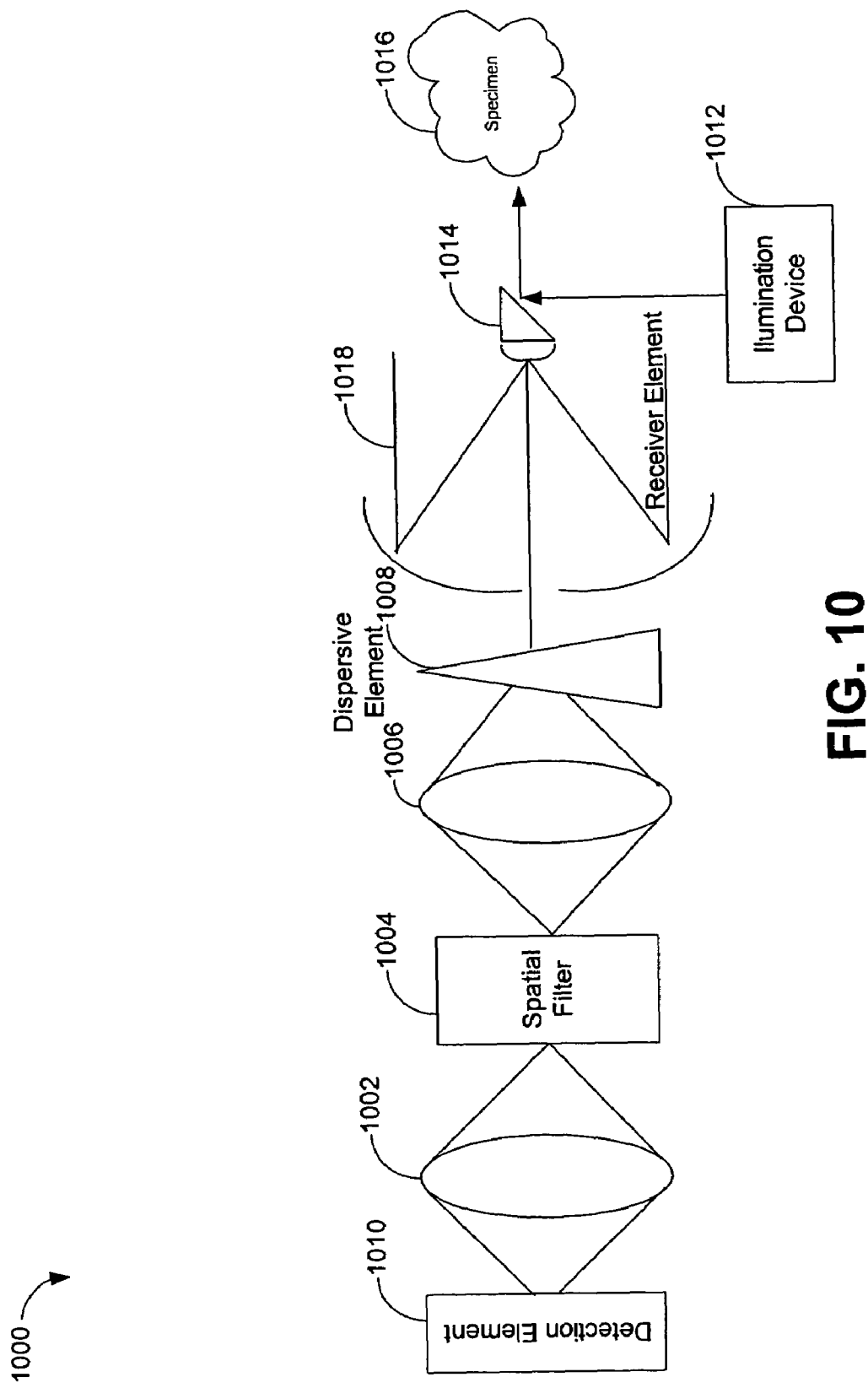
FIG. 10 depicts a stand off detection system of a correlation system of the present disclosure.

Another embodiment of the present invention generally behaves in accordance with that which is described herein. However, another embodiment is system 1000 described with reference to FIG. 10.

System 1000 comprises a receiver element 1018, a dispersive element 1008, imaging lenses 1006 and 1002, spatial filter 1004, and a detection element 1010. Each component operates as described herein with reference to FIG. 2. However, the specimen 1016 is remotely located from the optics described.

In order to receive and analyze data regarding the remotely located specimen, the receiver element 1018 further comprises an optical device 1014, e.g., a mirror, that directs the illumination to the specimen. Further, an illumination device 1012 transmits light directed at the optical device 1014, which is reflected toward specimen 1016. The specimen 1016 reflects and/or emits light, which is then received via receiver element. Therefore, the specimen 1016 does not have to be contained within a housing as described herein with reference to FIG. 2.

Figure 11:
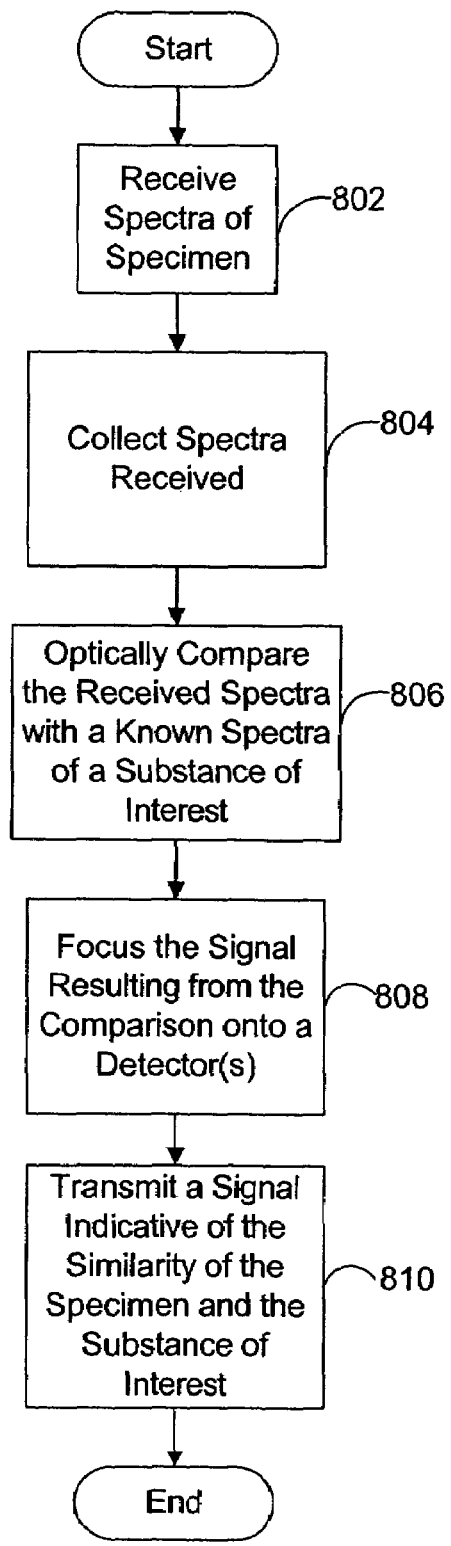
FIG. 11 illustrates an exemplary architecture and functionality of the correlator system of FIG. 1.

An exemplary architecture and functionality of the correlator system 100 is now described with reference to FIG. 11.

The correlator system 100 (FIG. 3) receives a spectra of a specimen 220 (FIG. 4), as indicated in step 802. The correlator system 100 then collects the spectra and images the spectra onto comparison optics 108, as indicated in step 804. Notably, a cylindrical lens, spherical lens, or any other type of lens known in the art that can image the spectra onto the optics 108 may be employed for this step as collection mechanism 102.

The comparison optics 108 then performs an optical comparison of the received spectra with a known spectra of a substance of interest, as indicated in step 806. For example, the comparison optics 108 may encompass a spatial filter that embodies the Fourier transform of the substance of interest, and the optics 108 may image the Fourier transform of the spectra of the received specimen onto the spatial filter, which effectively, optically performs a multiplication of the Fourier transform of the received spectra with the Fourier of the substance of interest.

The result of the comparison step 806 is then focused onto a detector(s), as indicated in step 808. The detector then transmits a signal indicative of the similarity of the specimen indicated by the received spectra with the substance of interest, as indicated in step 810.

Figure 12:
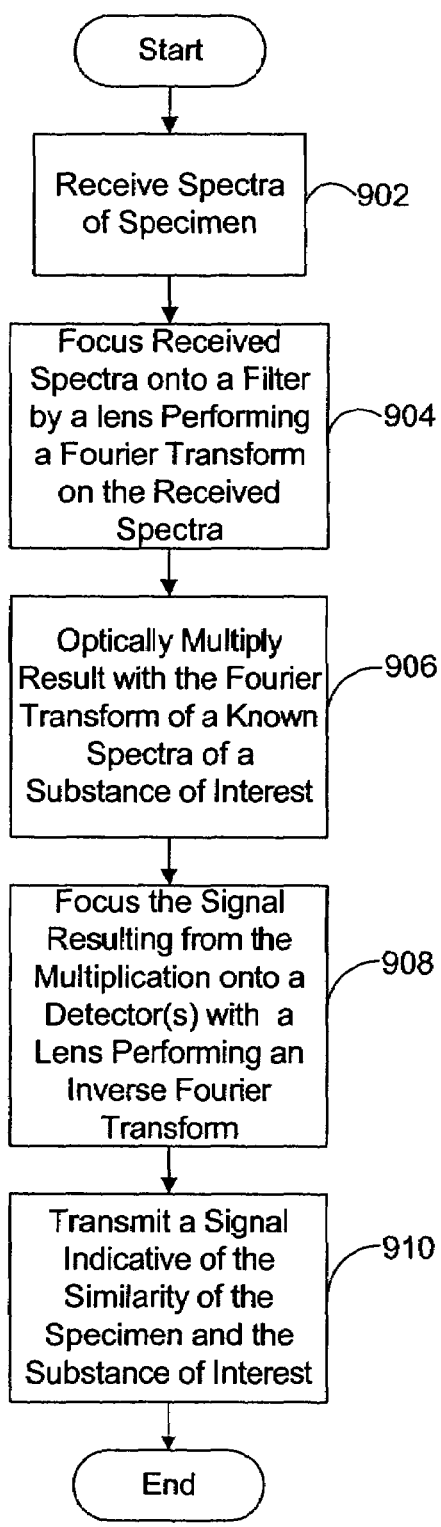
FIG. 12 illustrates another exemplary architecture and functionality of the correlator system of FIG. 1.

FIG. 12 is a flowchart illustrating another exemplary architecture and functionality of the correlator system 100.

The correlator system 100 receives the spectra of the specimen 220, as indicated in step 902. The spectra is focused onto a spatial filter 212 (FIG. 4) by a lens 210 (FIG. 4), which performs a Fourier transform on the received spectra, as indicated in step 904. The system 100 then optically multiplies the transformed spectra with a Fourier transform of a known spectra of a substance of interest, as indicated in step 906. The system 100 then focuses the optical signal resulting from the comparison onto a detector(s) via a lens, which performs an inverse Fourier transform of the multiplication, as indicated in step 908 and which focuses the result of the inverse Fourier transform onto a detector(s), as indicated in step 910 . The detector then transmits a signal indicative of similarity of the specimen indicated by the received spectra with the substance of interest, as indicated in step 910.

Figure 13:
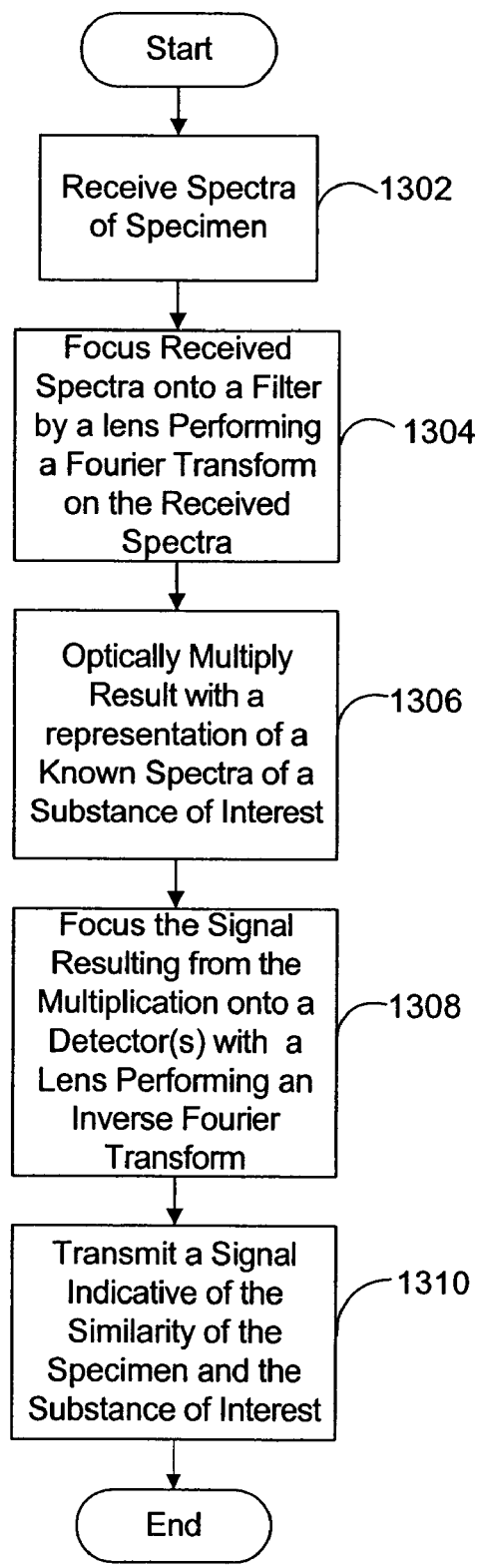
FIG. 13 illustrates another exemplary architecture and functionality of the correlator system of FIG. 1.

FIG. 13 is a flowchart illustrating another exemplary architecture and functionality of the correlator system 100.

The correlator system 100 receives the spectra of the specimen 220, as indicated in step 1302. The spectra is focused onto a spatial filter 212 (FIG. 4) by a lens 210 (FIG. 4), which performs a Fourier transform on the received spectra, as indicated in step 1304. The system 100 then optically multiplies the transformed spectra with a representation of a known spectra of a substance of interest, as indicated in step 1306. The system 100 then focuses the optical signal resulting from the comparison onto a detector(s) via a lens, which performs an inverse Fourier transform of the multiplication, as indicated in step 1308 and which focuses the result of the inverse Fourier transform onto a detector(s), as indicated in step 1310. The detector then transmits a signal indicative of the similarity of the specimen indicated by the received spectra with the substance of interest, as indicated in step 1310.

What is claimed:

1. A spectral correlator, comprising:
    a specimen;
    an optical device configured to collect light from the specimen and to optically determine a similarity of a received first spectra of the light collected from the specimen and a second known spectra by directly comparing the light to a representation of the second known spectra, wherein the optical device comprises a first lens configured to perform a Fourier transform on the received first spectra, and wherein the optical device is further configured to output a similarity signal indicative of the similarity; and
    a detection device configured to sense the similarity signal and determine, based upon the similarity signal, whether at least one substance, represented by the second known spectra, is present in the specimen.

2. The spectral correlator of claim 1, further comprising a spatial filter containing the Fourier transform of the second known spectra.

3. The spectral correlator of claim 2, wherein the first lens transmits a signal indicative of the Fourier transform of the received first spectra to the spatial filter.

4. The spectral correlator of claim 3, further comprising a second lens configured to receive a second signal from the spatial filter and transmit a signal indicative of the similarity of the received first spectra and the known spectra onto the detection device.

5. The spectral correlator of claim 4, wherein the specimen is in direct proximity to the optical device.

6. The spectral correlator of claim 4, wherein the specimen is remote from the optical device.

7. The spectral correlator of claim 6, wherein the spatial filter, the first lens, and the second lens are arranged such that a variation with time of the similarity signal indicates a concentration of a specimen indicated by the second known spectra.

8. The spectral correlator of claim 1, further comprising a spatial filter, wherein the spatial filter contains the representation of the second known spectra.

9. The spectral correlator of claim 8, wherein the first lens transmits a signal indicative of the Fourier transform of the received first spectra to the spatial filter.

10. The spectral correlator of claim 9, wherein the optical device further comprises a second lens configured to receive a second signal from the spatial filter indicative of the first signal and the representation of the known spectra.

11. The spectral correlator of claim 10, wherein the second lens is configured to focus the received second signal and transmit a signal indicative of the similarity of the received first spectra and the known spectra onto a detection device.

12. The spectral correlator of claim 11, wherein the specimen is in direct proximity to the correlator.

13. The spectral correlator of claim 11, wherein the specimen is remote from the optical device.

14. The spectral correlator of claim 13, wherein the spatial filter, the first lens, and the second lens are arranged such that a variation with time of the similarity signal indicates a concentration of the specimen indicated by a second known spectra.

15. A spectral correlator, comprising:
    a specimen;
    an illuminating device configured to illuminate the specimen;
    an optical device configured to filter light from the specimen using an optical filter indicative of a known spectra and to determine, based on the filtered light, a similarity of a received spectra defined by the light and the known spectra, wherein the optical device comprises a first lens configured to perform a Fourier transform on the received spectra, and wherein the optical device is configured to output a signal indicative of the similarity; and
    a detection device configured to sense the similarity signal and determine, based upon the similarity signal, whether at least one substance, represented by the known spectra, is present in the specimen.

16. The spectral correlator of claim 15, further comprising a spatial filter, wherein the spatial filter contains the Fourier transform of the known spectra.

17. The spectral correlator of claim 16, wherein the first lens transmits a signal indicative of the Fourier transform of the received spectra to the spatial filter.

18. The spectral correlator of claim 17, wherein the optical device further comprises a second lens configured to receive a second signal from the spatial filter indicative of the first signal and the Fourier transform of the known spectra.

19. The spectral correlator of claim 18, wherein the second lens is configured to focus the received second signal and transmit a signal indicative of the similarity of the received spectra and the known spectra onto a detection device.

20. The spectral correlator of claim 19, wherein the received spectra is a Raman spectra resulting from the illuminating device illuminating the specimen and the known spectra is a known Raman spectra.

21. The spectral correlator of claim 16, wherein the spatial filter contains a representation of the known spectra.

22. The spectral correlator of claim 21, wherein the first lens transmits a signal indicative of the Fourier transform of the received spectra to the spatial filter.

23. The spectral correlator of claim 22, wherein the optical device further comprises a second lens configured to receive a second signal from the spatial filter indicative of the first signal and the representation of the known spectra.

24. The spectral correlator of claim 23, wherein the second lens is configured to focus the received second signal and transmit a signal indicative of the similarity of the received spectra and the known spectra onto a detection device.

25. The spectral correlator of claim 24, wherein the received spectra is a Raman spectra resulting from the illuminating device illuminating the specimen and the known spectra is a known Raman spectra.

26. The spectral correlator of claim 25, wherein the spatial filter, the first lens, and the second lens are arranged such that a variation with time of the similarity signal indicates a concentration of the specimen indicated by a known spectra.

27. A spectral correlation method, comprising the steps of:
receiving light from a specimen;
optically performing a first Fourier transform on a first spectra of the light as the light is passing through a first lens to obtain a transformed first spectra;
optically multiplying the transformed first spectra with a representation of a known spectra to provide a similarity signal;
focusing, via a second lens, the similarity signal on a detector;
providing an indication as to whether at least one substance is present in the specimen based on the similarity signal.

28. The method of claim 27, wherein the representation of the known spectra is a Fourier transform of the known spectra.

29. The method of claim 27, wherein the performing step, the multiplying step and the focusing step are optically performed via an optical device.

30. The method of claim 29, wherein the specimen is remotely located from the optical device.

31. The method of claim 29, wherein the specimen is housed proximate to the optical device.

32. The method of claim 27, wherein the first spectra is a Raman spectra, and the known spectra is a Raman spectra.

33. The method of claim 32, wherein the performing and multiplying steps are performed such that a variation with time of the similarity signal indicates a concentration of a specimen indicated by the known spectra.

34. A spectral correlation method, comprising the steps of:
receiving light from a specimen;
separating a first spectra of the light into its component colors;
optically multiplying the separated first spectra with a representation of a known second spectra as the light is passing through an optical component indicative of the known second spectra to obtain an optical signal indicative of the degree to which the first spectra and the known second spectra are similar;
detecting the optical signal;
measuring an intensity of the optical signal;
comparing a value indicative of the measured intensity to a threshold; and
providing an indication as to whether at least one substance is present in the specimen based on the comparing step.

35. A spectral correlation method, comprising the steps of:
receiving light from a specimen;
filtering the light with an optical filter indicative of a known spectra corresponding to at least one substance such that a spectra of the light is optically multiplied depending on a similarity between the spectra of the light and the known spectra, wherein the filtering step comprises the step of performing an analog multiplication of a Fourier transform of the spectra of the light with a Fourier transform of the known spectra;
determining whether the at least one substance is present in the specimen based on the filtered spectra; and
providing an indication as to whether the at least one substance is present in the specimen based on the determining step.

36. The method of claim 35, further comprising the step of performing a Fourier transform on the spectra of the light as the spectra of the light is passing through a first lens.

37. The method of claim 36, further comprising the step of performing an inverse Fourier transform on the filtered spectra as the filtered spectra is passing through a second lens.

38. A spectral correlator, comprising:
a specimen; and
an optical device configured to collect light from the specimen and to optically determine a similarity of a received first spectra of the light collected from the specimen and a second known spectra by directly comparing the light to a representation of the second known spectra thereby providing an optical signal indicative of the degree to which the received first spectra and the second known spectra are similar, the optical device configured to store a threshold and to measure an intensity of the optical signal thereby providing a measured value, the optical device further configured to perform a comparison between the measured value and the threshold and to provide an indication as to whether at least one substance is present in the specimen based on the comparison.

39. The spectral correlator of claim 2, wherein the spatial filter is configured to optically multiply the Fourier transform of the received first spectra with the Fourier transform of the second known spectra.

40. The spectral correlator of claim 39, wherein the similarity signal has an intensity that is greater if the substance is present in the specimen.

* * * * *